Feb. 12, 1957 L. D. WEIR ET AL 2,781,134
APPARATUS FOR CONTROLLING TRUCK OPERATION FROM CRANE CAB
Filed June 9, 1953 7 Sheets-Sheet 1
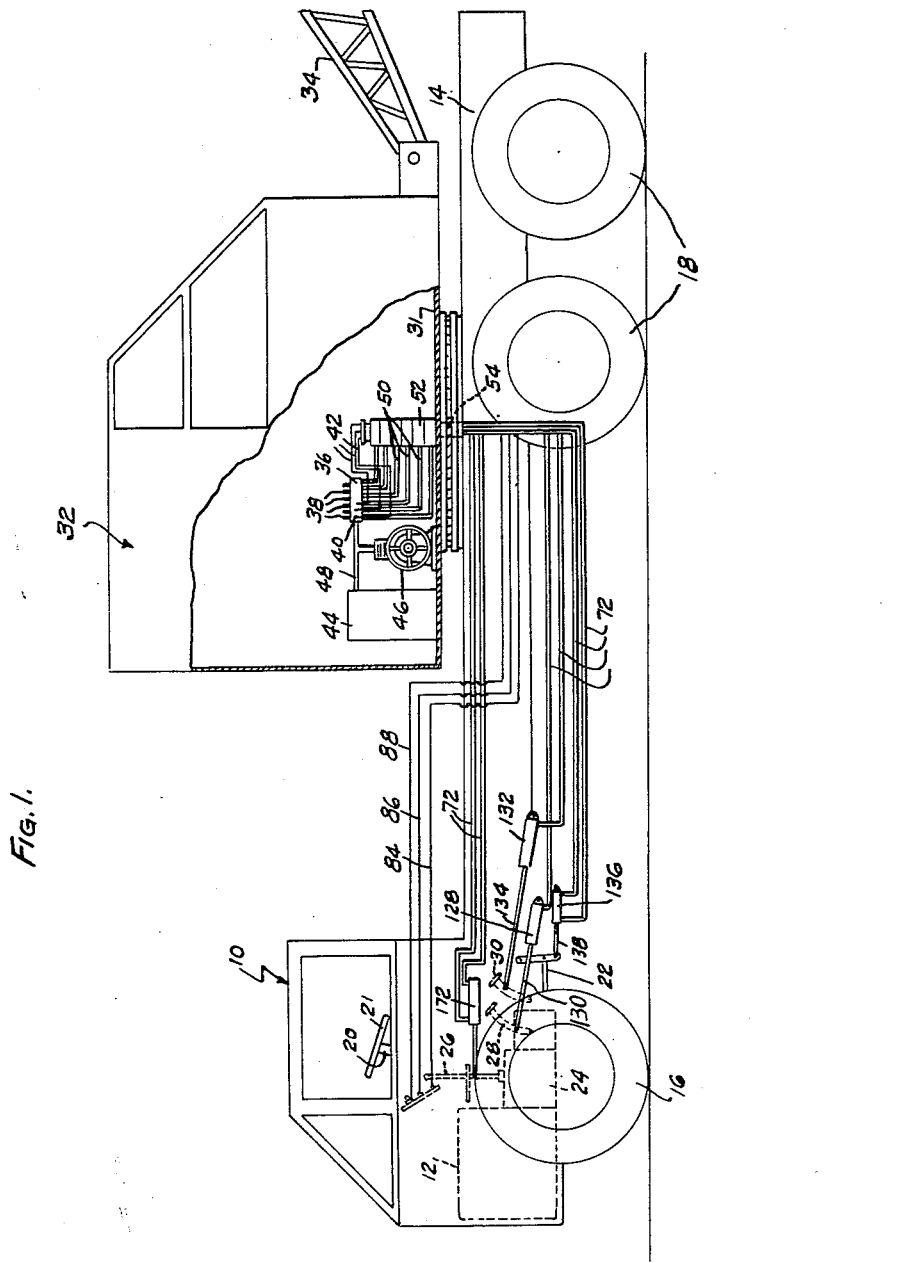
INVENTORS.
LEE D. WEIR
BY LEE WHITCOMB
Harry H. Hitzeman
ATTORNEY Feb. 12, 1957  L. D. WEIR ET AL  2,781,134
APPARATUS FOR CONTROLLING TRUCK OPERATION FROM CRANE CAB
Filed June 9, 1953  7 Sheets-Sheet 2
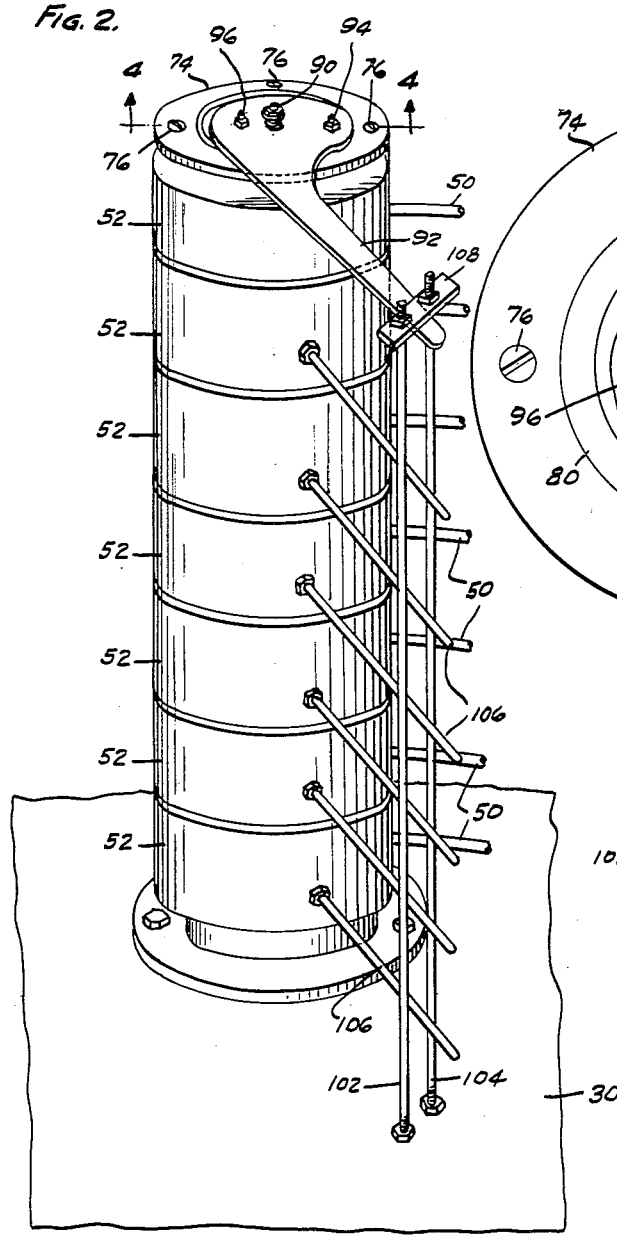
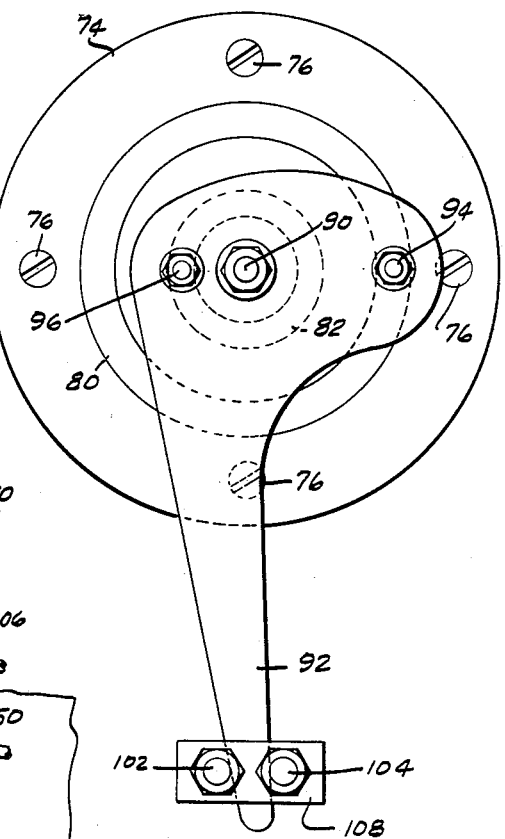
INVENTORS.
LEE D. WEIR
BY  LEE WHITCOMB
Harry H. Hitzeman
ATTORNEY Feb. 12, 1957 L. D. WEIR ET AL 2,781,134
APPARATUS FOR CONTROLLING TRUCK OPERATION FROM CRANE CAB
Filed June 9, 1953 7 Sheets-Sheet 3
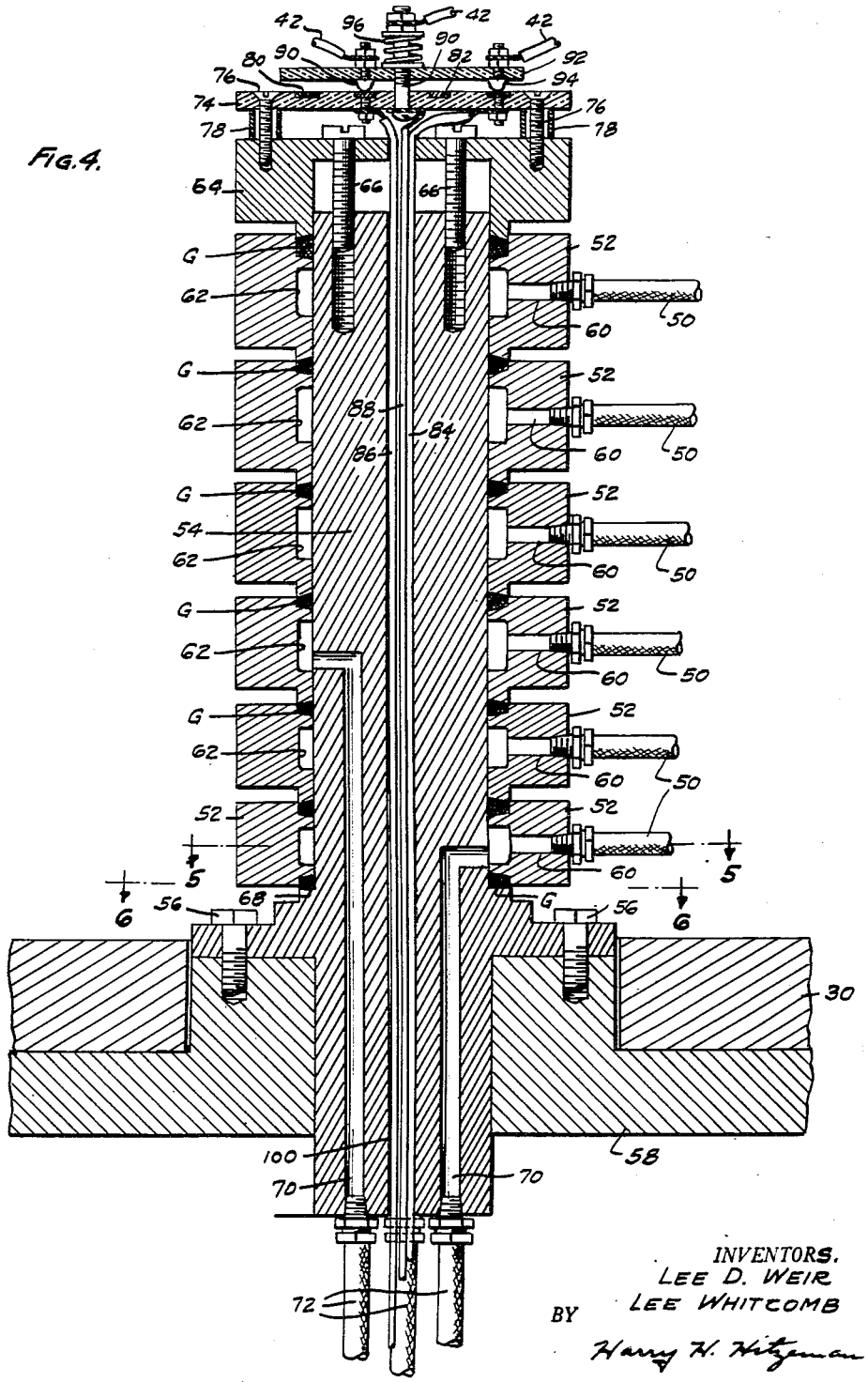
INVENTORS.
LEE D. WEIR
LEE WHITCOMB
BY
Harry H. Hitzeman
ATTORNEY.

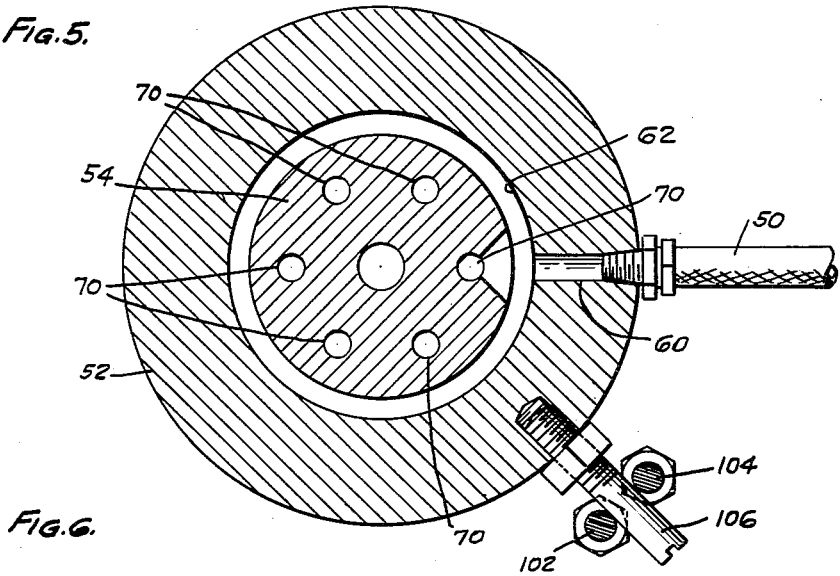
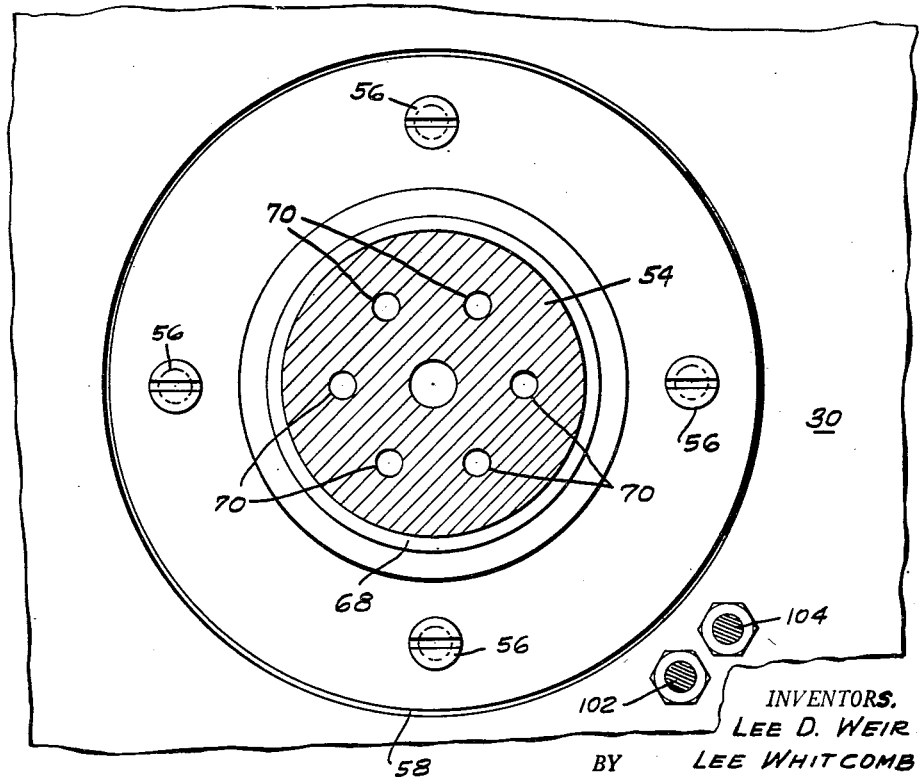

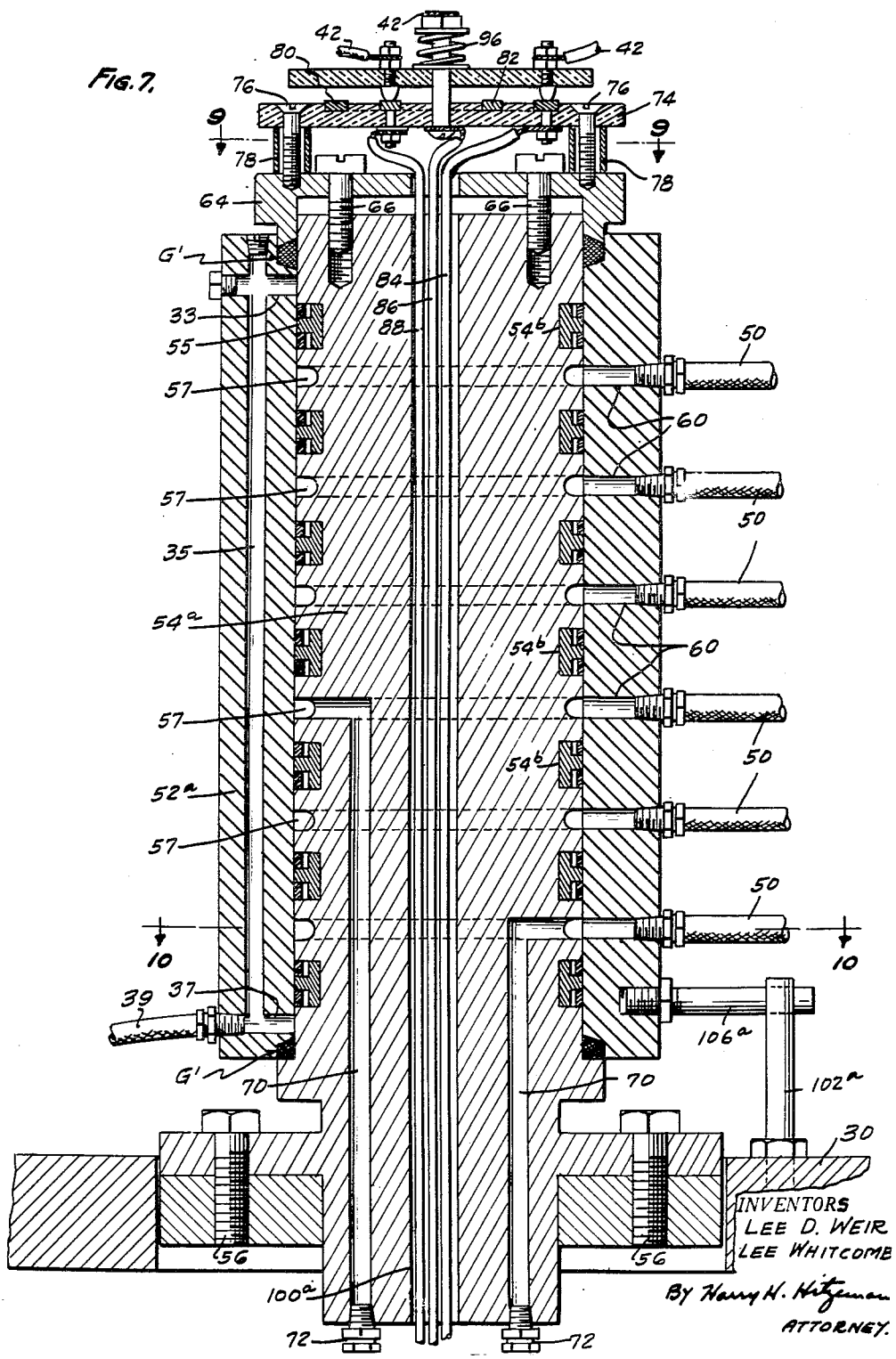

Feb. 12, 1957     L. D. WEIR ET AL     2,781,134
APPARATUS FOR CONTROLLING TRUCK OPERATION FROM CRANE CAB
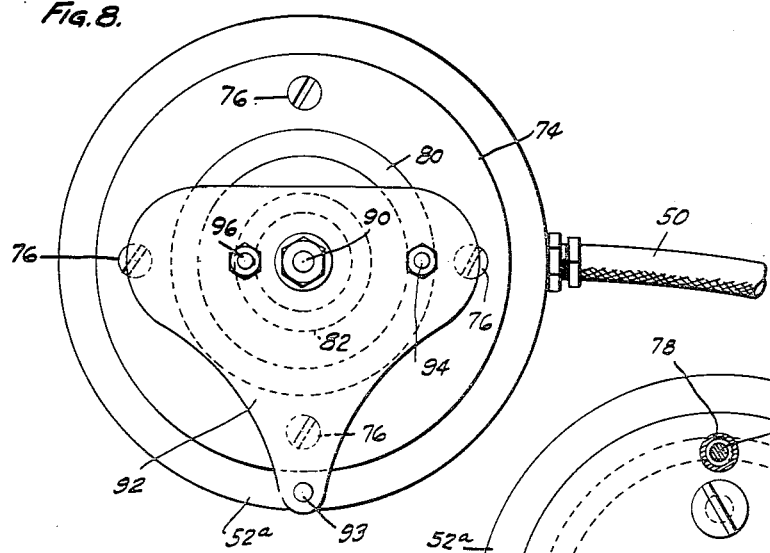
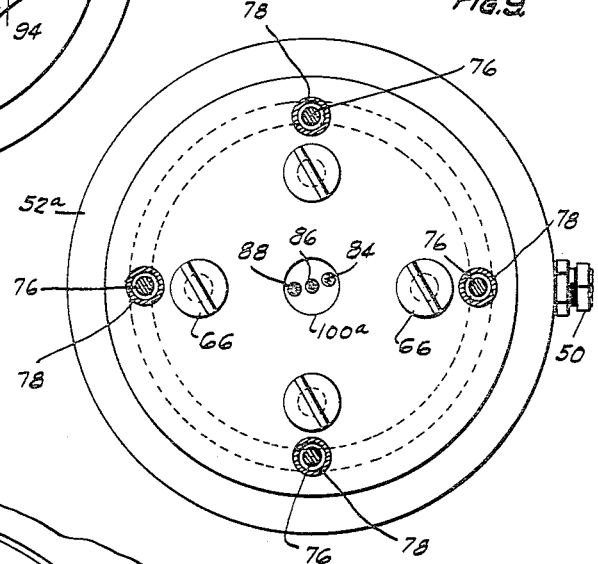
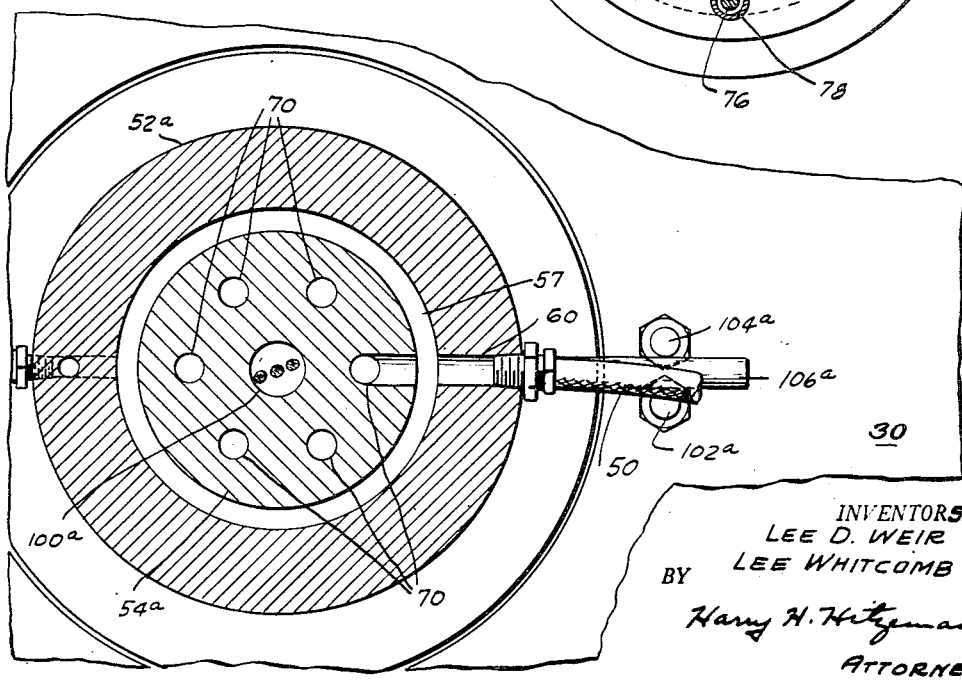
INVENTORS.
LEE D. WEIR
LEE WHITCOMB
BY Harry H. Hitzeman
ATTORNEY.

Feb. 12, 1957 L. D. WEIR ET AL 2,781,134
APPARATUS FOR CONTROLLING TRUCK OPERATION FROM CRANE CAB
Filed June 9, 1953 7 Sheets-Sheet 7
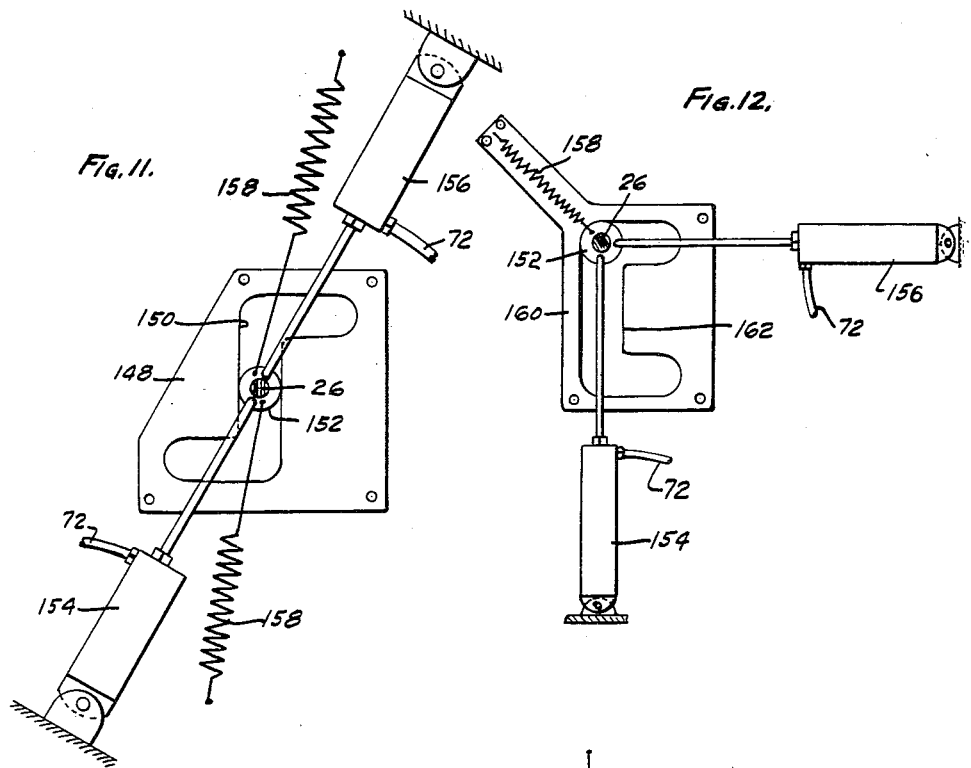
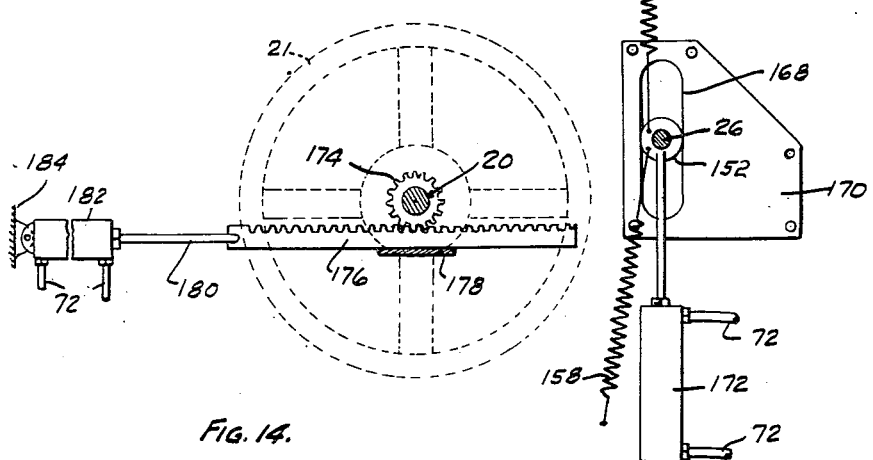
INVENTORS.
LEE D. WEIR
LEE WHITCOMB
BY
Harry H. Hitzeman
ATTORNEY.

United States Patent Office 2,781,134
Patented Feb. 12, 1957

2,781,134

APPARATUS FOR CONTROLLING TRUCK OPERATION FROM CRANE CAB

Lee D. Weir and Lee Whitcomb, Plainfield, Ill.

Application June 9, 1953, Serial No. 360,444

5 Claims. (Cl. 212—38)

Our invention relates to improvements in apparatus for controlling the operation of a truck from a crane cab mounted thereon.

Our invention relates more particularly to a control located in the cab of the crane for the operation of the truck motor and steering apparatus of the same, whereby by remote control in the cab of the crane the truck motor may be started, thrown into gear to move the truck back or forward and at the same time control the steering apparatus of the truck to steer the truck in whatever direction the crane operator wishes to move the same.

As is well known in the art, cranes are today used in a great many instances wherein the crane mechanism, including the control cab of the same, are mounted upon a rotatable platform on the frame of a truck which is normally used to transport the crane mechanism to and from the scene of use and which normally is inactive during the time that the crane is being used. However, in excavating, digging ditches, and other types of work for which the crane is used, it is frequently necessary to move the crane mechanism including the control cab forward or back on the job. In the past this has been done by another operator who sits in the cab of the truck and is directed by the crane operator from the crane cab to start the truck motor and move the truck and crane backwards, forwards or sideways, as is required. By this operation two persons are normally occupied in the use of the crane.

Our invention contemplates the provision in the crane cab of remote control means actuated by a source of power located in the crane cab for starting the truck motor and using the normal controls which are present on the same, such as the steering apparatus, the brakes, the transmission, to operate the truck to move the same about as though an operator were sitting in the cab of the truck.

The principal object of the present invention is to provide improved means located in the crane cab mounted on a truck for controlling the operation of the truck to move the same and to guide the same.

A further object of the invention is to provide means of the type described which is self-sufficient and completely independent from the normal source of power and guiding means which are usually found in a truck of the type described.

A further object of the invention is to provide remote control means of the type described mounted in the crane cab of the truck and actuated by fluid pressure to operate the normal controls of the truck.

A further object of the invention is to provide in connection with the normal control means of a truck, vacuum or air operated means remotely located in the crane cab for controlling the operation of the truck.

A further object of the invention is to provide means of the type described which are stationary with the crane cab, the crane cab being capable of complete rotation upon the frame of the truck.

A further object of the invention is to provide means of the type described which may include a central post mounted axially of the crane cab, said post having communication means therein for permitting power from the crane cab to be transmitted to operate all the normal controls of the truck.

Other objects and advantages will be more apparent from the following description wherein reference is had to the accompanying drawings, upon which:

Fig. 1 is a generally diagrammatic view illustrating a truck having a rotatable crane and crane cab mounted thereon and embodying one illustration of the manner in which the truck controls are actuated by remote control from the rotatable crane cab;

Fig. 2 is a perspective view generally illustrating the assembly of the stationary post or capstan in the crane cab and the various controls associated therewith;

Fig. 3 is a plan view of the parts shown in Fig. 2;

Fig. 4 is a vertical cross-sectional view through the capstan or post, associated parts, and the rotatable floor of the crane cab, and is taken generally on the line 4—4 of Fig. 2;

Fig. 5 is a plan sectional view thereof taken on the line 5—5 of Fig. 4;

Fig. 6 is a similar plan sectional view taken on the line 6—6 of Fig. 4;

Fig. 7 is a vertical cross-sectional view similar to Fig. 4 of a modified form of construction of the post or capstan and associated parts;

Fig. 8 is a plan view thereof;

Fig. 9 is a plan sectional view thereof taken on the line 9—9 of Fig. 7;

Fig. 10 is also a plan sectional view taken on the line 10—10 of Fig. 7;

Fig. 11 is a generally diagrammatic view of the operating means associated with the truck transmission control lever;

Fig. 12 is a similar view of the transmission control lever where the operation of the same is different from that shown in Fig. 11;

Fig. 13 is a similar view of the operating means for the transmission control lever where the movement of the same is forward for reverse and back to shift the transmission into low gear; and Fig. 14 is a diagrammatic view illustrating a modified mechanism for operating the steering apparatus of the truck.

In the embodiment of the invention which we have chosen to illustrate and describe, in Fig. 1 we have diagrammatically illustrated a truck 10 which may have a motor 12, a frame 14 and the usual front and back support wheels 16 and 18. The truck may also be provided with the usual steering mechanism 20 which includes wheel 21 for controlling the steering rod 22 for turning the front wheels of the truck. The truck may have the usual transmission 24 and shifting lever 26 together with brake pedal 28 and clutch pedal 30, all of which is at present standard equipment on vehicles of this type.

Adjacent the back end of the truck there is a turn table 30 which supports a crane cab 32 capable of revolving about on the same. Within the crane cab 32 are mounted the motor and controls for operating the crane 34. This is all standard equipment and forms no part of the invention.

The subject matter which forms a portion of our invention may include a control box 36 fixedly mounted in the crane cab 32, the control box 36 being provided with a plurality of valve control levers 38. We also provide electric switches 40 in the control box 36, the same being connected by electric conduits 42 to control the ignition switch and starter switch of the truck and to provide a signal light to indicate the condition of the truck operation.

In providing a fluid operated remote control mechanism, we provide a fluid tank 44 in the crane cab 32, a motor driven pump 46 and a supply line 48 extending from the pump to the control box 36.

A plurality of flexible conduits 50 may extend from the valves 38 in the control box to a plurality of ring members 52 mounted for rotation about a stationary capstan or post 54 that is fastened by suitable bolt members 56 to the top 58 of the truck frame 14. The ring members 52 are all formed with a passageway 60 which communicates with a circular groove 62 that surrounds the post 54. A cap member 64 is fastened over the top of the aligned ring members 52 and is fastened to the post 54 by bolt members 66. Suitable gaskets G are positioned between the lower end of the cap 64 and the upper end of the top ring member 52, and also between the stacked ring members to prevent leakage of fluid between the rings. A similar packing ring G is provided upon a shoulder 68 of the post 54 to support the lowermost ring member 52 and also to provide an effective seal at this joint.

Fluid which enters through any of the conduits 50 is adapted to be directed downwardly through vertical passageways 70 in the post 54. As best seen in Fig. 5, there are six passageways 70 shown, one communicating through a groove 62 and cross-bore 60 with each one of the fluid conduits 50. In a like manner, conduits 72 which are fastened in the bottom of the stationary post 54 in communication with passageways 70 extend forward from the post to the various operating means that are associated with the truck control mechanisms, as will be hereinafter described.

The electrical control mechanism which is operated by the switches 40 in the control box 36, may include a support member 74 fastened to the top of the stationary cap 64 of the post 54 by means of screw members 76, the member 74 being spaced therefrom by spacers 78 positioned about the screw members 76. A pair of contact rings 80 and 82 are embedded in the top space of the support member 74, the ring 80 having a lead 84 and the ring 82 having a lead 86. A third lead 88 is connected to a center bolt 90 which extends upwardly and has one of the leads 42 connected to the same. A control arm 92 carries a pair of contact pins 94 and 96 adapted to make contact throughout the rotation of the arm 92 on the contact rings 80 and 82. The arm 92 is normally held in frictional engagement through the pins by means of a spring member 96 on the bolt 90. All of the leads 84, 86 and 88 may extend downwardly through a center portion 100 in the stationary post 54. As will further be explained, the three leads may extend to the ignition switch of the truck, the starter switch, and to an indicator light to tell when the truck motor is running.

As has previously been stated, the control mechanism mounted in the crane cab is adapted to operate either during the revolution of the crane cab or at any point in the rotation of the same. For this reason and to carry the ring members 52 and the arm 92 about with the crane cab, we provide a pair of vertically disposed rods 102 and 104 positioned alongside of the rings 52, each of the rings 52 having an outwardly projecting pin or arm 106 which extends through the space between the upright rods 102 and 104. The extension of arm 92 also passes between the upright posts 102 and 104 and is fastened therebetween by a flat bracket 108. Thus when the floor 30 of the crane cab rotates, the ring members 52 and the arm 92 will be swung around in unison with the same. Due to the provision of the circular grooves 62 in each of the rings, fluid under pressure can thus enter through any of the conduits 50 and pass downwardly through the passageways 70 of the stationary post 54 at any point in the rotation of the crane cab.

Referring now to diagrammatic Fig. 1, the fluid conduits 72 and electric leads 84, 86 and 88 may extend forward in the truck body, the electric leads to the ignition switch, the starter switch and a signal light to indicate whether or not the truck motor is running. Means or pushing the clutch lever forward may comprise a fluid cylinder 128 pivotally mounted on the truck body 14 and provided with a piston rod 130 to move the clutch lever 28 inwardly. Means for operating the brake lever 30 may include a fluid operated cylinder 132 which has a piston rod 134 connected to the brake pedal 30 to press the same forward to apply the brakes in the usual manner. Means for controlling the steering of the truck may comprise a hydraulic cylinder 136 provided with a piston rod 138 that is connected to the steering rod 22 of the truck. A pair of conduits 72 will permit oil under pressure to enter either end of this cylinder to move the piston therein back or forth as desired to steer the truck.

Means for shifting the transmission lever of the vehicle (see Figs. 11 to 13) may vary depending upon the type of truck transmission employed. For example, in Fig. 11 wherein the transmission lever 26 must be swung back and to the left for reverse, and forward and to the right for low, we have provided a guide plate 148 fastened in any suitable manner in the truck cab, the guide plate having a Z-shaped guide groove 150, and the shift lever 26 being provided with a ring member 152 to ride in the same. We employ a pair of fluid cylinders 154 and 156, the cylinder 154 to move the shift lever into reverse and the cylinder 156 to move the shift lever into low gear. Coiled springs 158 at all times under tension assist in smoothness of operation during the shifting movement and to return the same to neutral. Each of the hydraulic cylinders is also pivotally mounted upon a suitable support so that ease and smoothness of operation is definitely assured.

In Fig. 12 we have shown an installation wherein we employ a fixed guide plate 160 which has a generally U-shaped guide groove 162 for the shift lever 26 and ring member 152 attached thereto. In this construction "low" is forward and to the right, and reverse is back and to the right. Here again we employ a pair of cylinders 154 and 156 to move the shift lever in the desired directions against a coiled spring member 158.

In Fig. 13 we have shown a comparatively simple type of transmission lever operating mechanism, where the reverse is back and low gear is forward. Here we provide an elongated guide groove 168 in a guide plate 170 and employ only one hydraulic cylinder 172 and a pair of extension springs 158. With this construction a double acting cylinder is required, and one of the fluid conduits 72 will be connected to each end of the hydraulic cylinder.

In Fig. 14 we have shown a modified form of operating the steering apparatus of the truck. This may include a pinion gear 174 mounted on the steering column 20 at a point adjacent the steering wheel 21. We provide a rack 176 suitably supported by brackets 178, the rack being connected at one end to the piston rod 180 of a hydraulic cylinder 182, the cylinder being pivotally connected to a suitable support 184 in the truck cab. With this construction the steering wheel can be turned either right or left by permitting fluid under pressure to enter the cylinder 182 upon either side of the piston therein.

From the foregoing description it can be seen that we have provided a remote control from the crane cab of the truck whereby the truck motor can be started and the truck driven forward or back or steered in the proper direction all by operating the control levers 38 in the crane cab. Due to the provision of the stationary post 54 and the swinging of the ring members about the same, the entire mechanism for controlling the operation of the truck control operating means is always at the finger tips of the crane operator, regardless of the arcuate position in which the crane cab is positioned.

In Figs. 7 to 10 we have shown a modified construction wherein instead of a plurality of ring members 52, we provide a solid ring member 52a and we have formed the stationary post 54a with spaced peripheral grooves 54b to accommodate leak-proof piston ring assemblies 55. We also provide spaced peripheral grooves 57 which communicate with the passageways 60 from the fluid conduits 50, the post 54a being otherwise in all respects identical with that previously described.

The electrical controls and the manner of mounting the same are all identical to that previously described, and like parts herein will all be referred to and receive like reference numbers. Since the ring member 52a with its multiple conduit connections is a single unit, it is only necessary to have one arm 106a fastened between two upright arm members 102a and 104a attached to the floor 30 of the crane cab. With this construction the electrical control arm 92 may be fastened for rotation with the rings 52a by means of a vertical pin 93 extending through the arm 92 and into the top of the ring 52a.

Also with this construction we have provided a packing seal $G^1$ at the top and a similar packing seal $G^1$ at the bottom of the ring member 52a above and below the series of leak-proof piston rings 55 which are themselves located upon the upper and lower sides of the fluid grooves 57 around the periphery of the post 54a. We also provide a drain hose 39 leading from a bore 37, a vertical bore 35 and another cross-bore 33 to the post 54a to collect any leakage which might pass by the top or bottom piston rings 55.

With this construction it can be seen that as the crane cab and crane turn about the center post 54a, the ring member 52a by means of the arm 106a, will be rotated with the same, and fluid under pressure in the conduits 50 will be capable of moving forward through the peripheral grooves 57 and into the downwardly extending passageways 70 of the post and out through the conduits 72 to the cylinders to which they are attached. In addition, the electrical conduits or leads 84, 86 and 88 will likewise be extended downwardly through the medial bore 100a in the stationary post 54a.

While the specific description herein has referred generally to the employment of fluid under pressure, a reservoir and a pump, it is obvious that with the same general construction air pressure may be employed and handled by means of the controls herein described in the same general manner. In the event it is desired to use vacuum, it is only necessary to have a vacuum tank in the crane cab instead of a fluid reservoir as in the case with oil, or a pressure tank as in the case with compressed air. It is believed to be clear from the description herein provided that any one of the three means of power is equally applicable to the mechanism herein assembled and capable of operation therethrough. While a general illustration and description have been given of the manner in which the operating cylinders are connected to the various control means of the truck, it is clear that modification and change may be made and variations in construction or attachment without departing from the generic basis of the invention.

We contemplate that such changes and modifications may be made, and we do not wish to limit ourselves; rather what we desire to secure and protect by Letters Patent of the United States is:

1. A remote control system for fluid operated cylinders including a turntable, a stationary axial post about which said turntable rotates, said post having an axial bore therethrough, a source of fluid under pressure mounted on said turntable, a control box therefor on said turntable, a conduit from said source to said control box, a plurality of valves in said box, a rotatable ring telescopically mounted over said post, said ring fastened to said turntable, conduits from said control box to said ring, said ring having passageways leading from said conduits to the bore of the same, peripheral grooves in the side of said post aligned with said passageways, said post having a plurality of passageways therein, one connected to each of said grooves, conduits connected to the lower end of the passageways in said post, said conduits extending to said fluid operated cylinders, an electric control including contact bands mounted on said post and leads therefrom extending through the axial bore in said post.

2. A remote control system for fluid operated cylinders including a turntable, a stationary axial post about which said turntable rotates, a source of fluid under pressure mounted on said turntable, a control box therefor on said turntable, a conduit from said source to said control box, a plurality of valves in said box, a rotatable ring telescopically mounted over said post, said ring fastened to said turntable, conduits from said control box to said ring, said ring having passageways leading from said conduits to the bore of the same, peripheral grooves in the side of said post aligned with said passageways, said post having a plurality of passageways therein, one connected to each of said grooves, and conduits connected to the lower end of the passageways in said post, said conduits extending to said fluid operated cylinders, an arm mounted on said ring, electric controls mounted on said control box, leads therefrom extending to the arm mounted on said ring, said post having contact bands thereon and leads extending from said bands thru an axial opening in said post.

3. The combination with an automotive vehicle of the type having a frame, propulsion wheels mounted beneath said frame in supporting relation thereto, brakes associated with said wheels, a brake operating lever, a motor, transmission means drivingly connecting said motor to said propulsion wheels, said transmission means including a shiftable control lever and a clutch lever, of a horizontally disposed fully revolvable crane cab turntable mounted on said frame, a crane cab on said turntable, a source of control-actuating power in said crane cab, operating means associated with said brake operating lever, said shiftable transmission control lever and said clutch lever, and selective means in said crane cab for connecting said actuating power located in said crane cab with the operating means for either of said levers to remotely operate the same, said selective means including a stationary axial post about which said turntable rotates, a source of fluid under pressure mounted on said turntable, a control box therefor on said turntable, a conduit from said source to said control box, a plurality of valves in said box, a rotatable ring telescopically mounted over said post, said ring fastened to said turntable, conduits from said control box to said ring, said ring having passageways leading from said conduits to the bore of the same, peripheral grooves in the side of said post aligned with said passageways, said post having a plurality of passageways therein, one connected to each of said grooves, and conduits connected to the lower end of the passageways in said post, said conduits extending to said fluid operated cylinders, an arm mounted on said ring, electric controls mounted on said control box, leads therefrom extending to the arm mounted on said ring, said post having contact bands thereon and leads extending from said bands through an axial opening in said post.

4. The combination with an automotive vehicle of the type having a frame, propulsion wheels mounted beneath said frame in supporting relation thereto, brakes associated with said wheels, a brake operating lever, a motor, transmission means drivingly connecting said motor to said propulsion wheels, said transmission means including a shiftable control lever and a clutch lever, of a horizontally disposed revolvable crane cab turntable mounted on said frame, a crane cab on said turntable, a source of control-actuating power in said crane cab, operating means associated with said brake operating lever, said shiftable transmission control lever and said clutch lever, and selective means in said crane cab for connecting said actuating power with the operating means for either of said levers to remotely operate the same, said operating means including fluid-operated cylinders for moving said levers, and said selection means including a stationary axial post about which said turntable rotates, a source of fluid under pressure mounted on said turntable, a control box therefor on said turntable, a conduit from said source to said control box, a plurality of valves in said box, a rotatable ring telescopically mounted over said post, said ring fastened to said turntable, conduits from said control box to said ring, said ring having passageways leading from said conduits to the bore of the same, peripheral grooves in the side of said post aligned with said passageways, said post having a plurality of passageways therein, one connected to each of said grooves, and conduits connected to the lower end of the passageways in said post, said conduits extending to said fluid operated cylinders, an arm mounted on said ring, electric controls mounted on said control box, leads therefrom extending to the arm mounted on said ring, said post having contact bands thereon and leads extending from said bands through an axial opening in said post.

5. The combination with an automotive vehicle of the type having a frame, propulsion wheels mounted beneath said frame in supporting relation thereto, brakes associated with said wheels, a brake operating lever, a motor, an electric switch for said motor, a starter and switch therefor, transmission means capable of drivingly connecting said motor to said propulsion wheels, said transmission means including a shiftable control lever and a clutch lever, of a stationary post on said frame, a horizontally disposed crane cab turntable mounted on said post and disposed on said frame, a crane cab on said turntable, a source of control-actuating power in said crane cab, operating means associated with said brake operating lever, said shiftable transmission control lever and said clutch lever and selective means in said crane cab for connecting said actuating power with either of said levers for remotely operating the same, electric switch means in said crane cab and revolvable therewith and circuit connections from said switch means to the motor switch and starter switch of said vehicle motor for remotely opening or closing said switches irrespective of the angular position of said crane cab, said electric switch control means including contact bands on said stationary post and leads therefrom extending through an axial bore in said post to said motor switch and said starter switch, said control actuating power in the revolvable crane cab being a source of fluid under pressure and the fluid being directed to the operating means through the stationary post about which said crane cab rotates.

References Cited in the file of this patent

UNITED STATES PATENTS

| | | |
|---|---|---|
| 2,075,819 | Manly | Apr. 6, 1937 |
| 2,254,192 | White | Aug. 26, 1941 |
| 2,322,679 | Williamson | June 22, 1943 |
| 2,557,498 | Collender | June 19, 1951 |
| 2,638,232 | Perkins | May 12, 1953 |
| 2,659,615 | McClain | Nov. 17, 1953 |
| 2,674,333 | Zeilman | Apr. 6, 1954 |

FOREIGN PATENTS

| | | |
|---|---|---|
| 263,203 | Sweden | Aug. 31, 1949 |